(No Model.)

C. LA DOW.
PULVERIZING HARROW.

No. 404,791. Patented June 4, 1889.

WITNESSES
E. C. Newman,
C. M. Newman,

INVENTOR
Charles La Dow,
By his Attorneys
Baldwin, Hopkins & Peyton

UNITED STATES PATENT OFFICE.

CHARLES LA DOW, OF ALBANY, NEW YORK.

PULVERIZING-HARROW.

SPECIFICATION forming part of Letters Patent No. 404,791, dated June 4, 1889.

Original application filed October 25, 1886, Serial No. 217,133. Divided and this application filed June 8, 1887. Renewed May 11, 1889. Serial No. 310,487. (No model.)

*To all whom it may concern:*

Be it known that I, CHARLES LA DOW, of the city and county of Albany, in the State of New York, have invented new and useful Improvements in Pulverizing-Harrows, of which the following is a specification.

My invention relates specially to that class of harrows which employ revolving spiral or screw cutters arranged in two opposing gangs.

Figure 1:
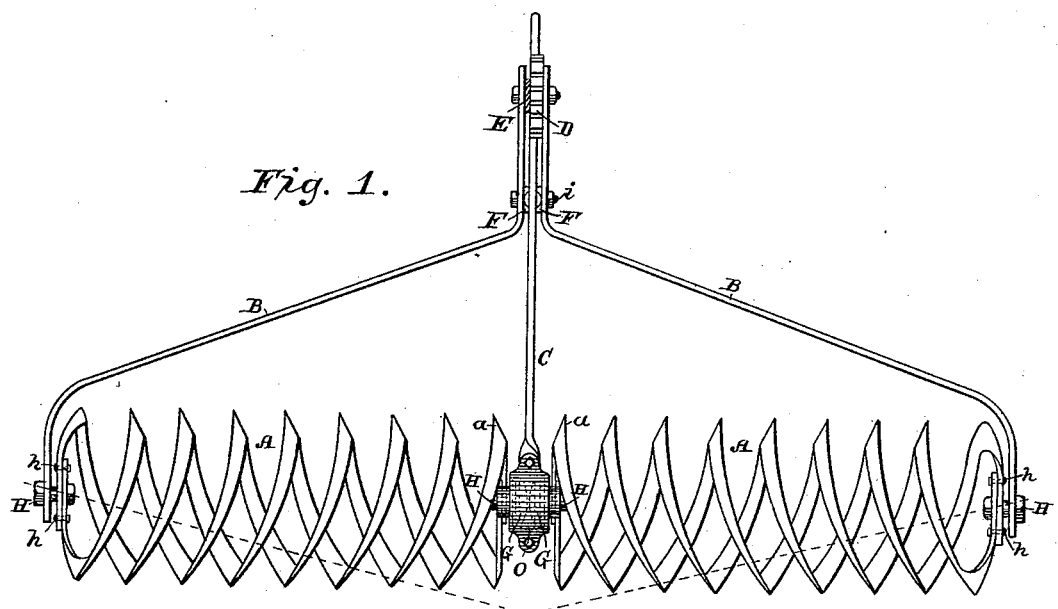
Figure 2:
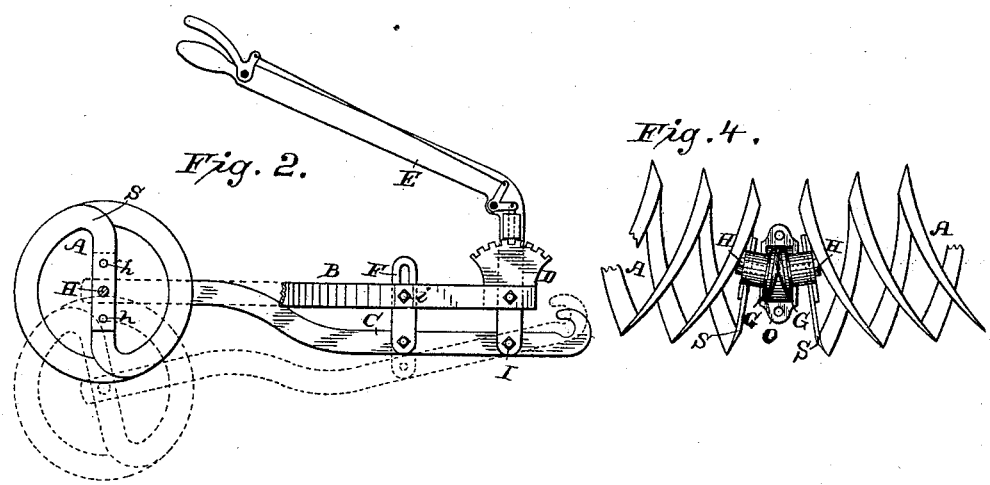
Figure 4:
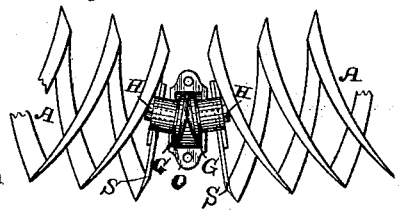
Figure 3:
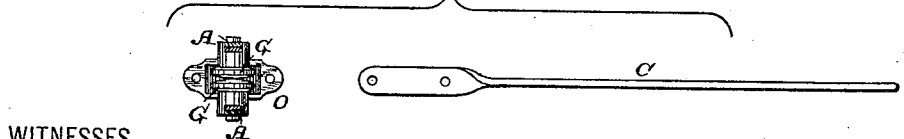

In the drawings, Figure 1 represents a top view of my invention, showing by two broken lines the direction in which the gangs may be angled, so as to throw the earth outward from center of machine. Fig. 2 is an end view showing by dotted lines the vibratory action of the gangs in a vertical direction. Fig. 3 is a detail view of the coupling-box between the gangs, the buffer within said box for counteracting the side thrust of the gangs, also showing the draw-bar for connecting the coupling-box to the adjusting mechanism on the draft-frame. Fig. 4 is a sectional view of the inner ends of the gangs when set at an angle and showing the action of the buffers.

The gangs are composed of bands of thin metal A, coiled spirally, so as to form a double screw, made dishing and having their edges beveled or sharpened.

The double spirals in each gang are attached together at their outer and inner ends by rivets $h\ h$, the spirals being mounted on each other by the bars S S, (shown as forming straight radial prolongations of the ends of the spirals,) instead of on a frame as heretofore. The bars S S may be formed out of part of the coils, or separate bars may be riveted to the coils instead. This construction permits the cutting-coils of the gang to spring with a vibrating motion, which motion is varied by the obstructions met or the character of the soil over which the implement is drawn. This spring motion tends to throw off all sticky soil, which would clog the spirals were they incapable of vibration.

It will be observed that the spirals have no axles or other frame-work to be clogged by the soil operated upon.

B B are the hounds or draft-frame bars, which are each attached to the outer ends of their gangs by the journal-pin H. The forward ends of the bars B B are attached together, forming a triangular frame.

C is a draw-bar attached to the center box O and to the ratchet-lever E. By moving this lever the gangs may be angled or brought into line relatively to each other. The front end of the draw-bar C is provided with a draft-hook; but the animals may be attached to the triangle in other ways.

F is a slotted link arranged to permit the inner ends of the gangs to vibrate downward, but preventing them from rising above a level by the pin $i$ striking the bottom of the slot in said link. This link and the lower end of the lever E act as parallel arms to cause the rod C to move endwise on a horizontal plane when adjusted, so that the link will exert equal pressure at all angles of the gangs.

G G are buffers attached to the inner ends of the spirals and arranged to counteract the side-thrust of the gangs when set at an angle to each other.

The buffers have flattened convex abutting surfaces, so as to abut at any angle to which they may be set. These buffers revolve within the center box, which is shaped to permit the revolution, vertical vibration, and horizontal adjustment of the buffers within it. The vertical vibration of the draw-bar is on the pin I, and the shape of the hounds, together with the slotted link, forms a stop to limit the vertical vibration of the gangs. The team being hitched to the front end of the triangular frame, they can turn the laterally-extending gangs around a corner more easily than if a pole were employed, and the hounds B are shaped to act as guards to protect the legs of the horses from being cut by the spirals. The lower end of the lever E is placed far enough in advance of the spirals to assist in coacting with the draft-frame to form a stop to limit the vertical vibration of the gangs, while the upper end of said lever is brought rearward far enough to permit its adjustment when the attendant is behind the gangs. The draft-bearings are at the extreme ends of the gangs and give the greatest possible leverage against the draft.

The entire structure is preferably made of metal, and is very light, cheap, and effective.

The preferred manner of making the spiral cutters shown is to wind the band or strip of metal edgewise in close convolutions around a shaft or cylinder, then form the concave with a drop, and then stretch endwise to obtain the desired distance between the coils.

The right to file an application for patent on the method of manufacture is reserved.

This application is a division of my original case, filed October 25, 1886, No. 217,133, and I do not therefore claim herein any subject-matter claimed or which may hereafter be claimed in said original application. In application Nos. 221,401, filed December 13, 1886, and No. 223,616, filed January 6, 1887, I have shown screw harrows or pulverizers somewhat analogous to the machine herein illustrated, and I therefore disclaim herein any subject-matter claimed in said two applications.

I claim as my invention—

1. In a pulverizer, the double spirals A, mounted upon each other, in combination with a draft-frame.

2. In a pulverizer, a draft-frame, in combination with a gang of spiral cutters mounted upon each other so as to have spring motion or resilience.

3. In a pulverizer, two gangs of opposing cutters, buffers having flattened abutting surfaces between the gangs, a box which loosely envelops the buffers, so they can roll upon each other, and a draw-bar for the box, in combination with a draft-frame.

4. In a pulverizer, two gangs of opposing cutters, buffers having flattened convex abutting surfaces working against each other between the gangs, and a box which loosely envelops the buffers, so they can roll upon each other, for maintaining both buffers in a uniform horizontal and vertical plane with each other, in combination with a draft-frame.

5. In a screw-pulverizer, the combination of the double spiral cutters having the end pieces or bars S, for attaching the spirals to each other.

6. In a pulverizer, two gangs of horizontally-adjustable cutters and a draft-frame, in combination with a lever for operating the bar C, said lever being bent rearward, so as to be reached from the rear of the gangs.

7. In a pulverizer, a draft-frame, two gangs of cutters, and two opposing buffers having flattened abutting heads, each head being mounted on a stem smaller than the head, in combination with a coupling-box loosely enveloping the buffers, so they can roll upon each other, and having flanges which coact with the buffer-heads to prevent the gangs from spreading apart.

8. In a pulverizer, a cylindrical gang of spiral cutters composed of two or more strips of metal mounted upon each other by means of intermediate fastenings, which are attached to the strips at two points only at or near the ends of the gang.

9. In a pulverizer, a cylindrical gang of spiral cutters adapted to revolve upon hubs or pins attached to the ends of the spirals only, in combination with a draft-frame connected with said hubs or pins.

10. In a pulverizer, a draft-frame, in combination with a cylindrical gang of spiral cutters adapted to thrust part of the soil laterally and to permit part thereof to pass through the gang without encountering other obstruction than presented by the spirals.

11. In a harrow or pulverizer, the combination, substantially as set forth, of two gangs of cutters set at right angles to the line of draft and adapted to create end-thrust by contact with the soil, a draft-frame, connections between the extreme outer ends of the gangs, and said frame located in the axial line of the gangs, and a hinge-connection between the extreme inner ends of the gangs and frame on which each gang independently vibrates, also located in the axial line of the gangs, whereby the end-thrust of the gangs is counteracted from a point directly in line with the center of revolution of the gangs.

12. In a pulverizer, a cylindrical spiral cutter without an interior frame or axle, adapted to revolve in bearings at its ends, in combination with a draft-frame in which it is mounted.

13. In a pulverizer, two opposing gangs of right and left spiral cutters adapted to counteract the inward side-thrust of each other by contact between their inner ends, in combination with a draft-frame in which the gangs are mounted.

14. A spiral cutter formed of a continuous strip of metal coiled into a cylindrical spiral without an interior frame or axle shape, and supported at its ends only.

15. A cutter formed of a continuous strip of spring metal coiled into a cylindrical spiral the convolutions of which are capable of springing or vibrating, for the purpose described, in combination with a frame in which it is mounted.

16. The combination of the frame and draft devices and spiral cutters which throw the earth from each other and are so constructed as to permit part of the earth cut up to pass inwardly endwise through the cutters to fill the furrow formed at their inner ends.

In testimony whereof I have hereunto subscribed my name.

CHARLES LA DOW.

Witnesses:
CHAS. H. MILLS,
GEORGE TIFFANY.